J. VAN BEEK.
SLEIGH RUNNER KNEE.
APPLICATION FILED FEB. 25, 1918.
1,293,581.
Patented Feb. 4, 1919.
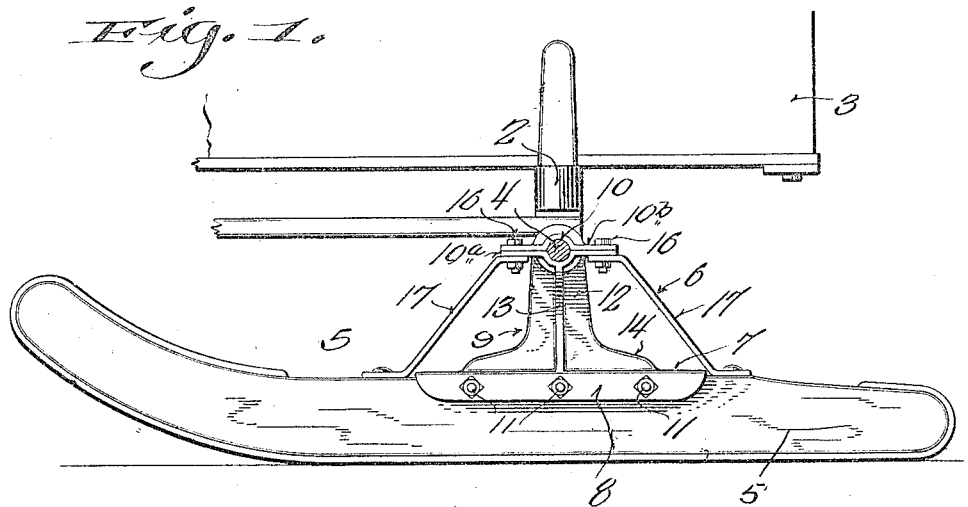
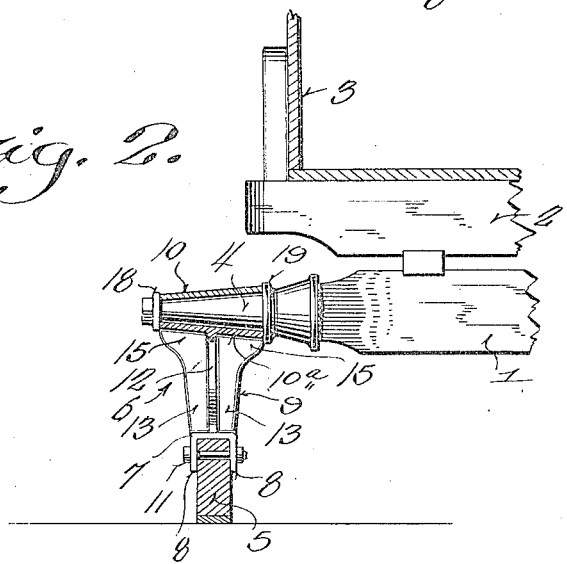

UNITED STATES PATENT OFFICE.

JOSEPH VAN BEEK, OF BARTON, WISCONSIN.

SLEIGH-RUNNER KNEE.

1,293,581.

Specification of Letters Patent.

Patented Feb. 4, 1919.

Application filed February 25, 1918. Serial No. 219,006.

*To all whom it may concern:*

Be it known that I, JOSEPH VAN BEEK, a citizen of the United States, and resident of Barton, in the county of Washington and State of Wisconsin, have invented certain new and useful Improvements in Sleigh-Runner Knees; and I do hereby declare that the following is a full, clear, and exact description thereof.

My invention consists in improvements in sleigh runners which may be associated with the running gear of an ordinary wagon or carriage after the usual wheels thereof have been removed to transform the same into a sleigh.

It is also an object of the invention to provide an arrangement whereby sleigh runners may be pivoted to vehicle bodies to permit them to readily ride over obstructions in the road without the usual strains which occur when the runners are rigidly connected with their supporting beams.

A still further object is to provide an improved sleigh knee which can be readily secured to practically any form of runner and to any vehicle axle.

With the foregoing and other objects in view the invention consists in the novel features of construction, combination and arrangement of parts which will be hereinafter more particularly described and claimed and shown in the drawing, wherein:

Figure 1 represents a side elevational view of a portion of a wagon body having a sleigh runner of improved design attached to the axle thereof, the latter being shown in section.

Fig. 2 is a sectional view showing more particularly the parts illustrated in Fig. 1.

Referring more particularly to the accompanying drawing wherein the invention is shown applied to a portion of a wagon of usual design, it will be seen that the numeral 1 denotes a supporting axle upon which a bolster 2 is disposed; the wagon body 3 in turn being supported at one end on said bolster. The axle 1 also includes a spindle 4 formed in each end thereof from which the usual wheels have been removed.

As hereinbefore mentioned the invention is designed to pivotally mount a sleigh runner beam 5 on each one of the spindles 4. For this purpose an improved knee 6 is provided, the same including an elongated channel plate 7, the flanges 8 of which are disposed apart a distance substantially equal to the width of the runner beam and engaging the opposite sides thereof, a standard 9 and an axle box 10. When the channel plates 7 are disposed over the runner beams bolts or the like 11 are disposed through the flanges 8 to secure the former to the latter.

The standard 9 is of light, yet very strong construction inasmuch as it includes a pair of ribs 12 disposed longitudinally of the plate 7 and a second pair of ribs positioned transversely of said plate. As shown at 14 the lower end portions of the ribs 12 are materially widened to brace the standard at its connection with the plate 7. Similarly the other ribs 13 have their upper end portions widened as at 15, the width of said ribs at their connection with the box 10 being equal to the length of the latter.

Although the axle box may be of any preferred design it is—in the present instance formed of two separate parts $10^a$ and $10^b$, each of which include laterally extending attaching flanges secured together by bolts and nuts 16. To procure a very strong knee, the channel plates 7, the standard 9 and the lower part $10^a$ of the axle box are cast as one piece. The box and the upper end of the standard are braced by rods 17 which extend laterally from the flanges of said box, being attached thereto by the bolts and nuts 16, and are secured to the runner beam 5 adjacent the ends of the plate 7 as shown in Fig. 1.

When it is desired to transform a wagon or other wheeled vehicle into a sleigh, it is simply necessary to remove the nuts 18 which are threaded on the ends of the spindles 4 take off the wheels and substitute therefor the runner beams 5 on which have previously been secured the knees 6. The axle boxes of the knees are disposed on the spindles 4 until the inner ends of the former abut the usual collars 19 disposed at the inner ends of the spindles. When the nuts 18 are again placed in position the runners will be securely, yet pivotally mounted upon the wagon gear. Attention is directed to the fact that the inner rib 13 has its widened portion 15 engaged with the collars 19.

I claim:—

A sleigh runner for attachment to an axle spindle, comprising a runner beam, a knee post having an elongated channel portion at its lower end receiving the runner beam, securing members passed through the sides of said channel portion and through the runner beam, the top of the post being channeled to receive an axle spindle, lateral ears on the upper end of the post, a spindle box member having its end portions disposed over said ears, rods secured to the runner beam outwardly of the channel portion of the post and extending obliquely upward and inward, and common securing bolts passed through the ends of the axle box members and through the said ears and through the upper ends of the rods.

In testimony that I claim the foregoing I have hereunto set my hand at Milwaukee, in the county of Milwaukee and State of Wisconsin.

JOSEPH VAN BEEK.